(12) United States Patent
Nakamura et al.

(10) Patent No.: US 8,151,591 B2
(45) Date of Patent: Apr. 10, 2012

(54) AIR CONDITIONING CASE AND DRAIN FOR CONDENSATE REMOVAL

(75) Inventors: Takeshi Nakamura, Novi, MI (US); Scott Benedict, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 725 days.

(21) Appl. No.: 11/681,812

(22) Filed: Mar. 5, 2007

(65) Prior Publication Data

US 2008/0216502 A1 Sep. 11, 2008

(51) Int. Cl.
F25D 21/14 (2006.01)
(52) U.S. Cl. .......................................... 62/285
(58) Field of Classification Search .............. 62/285, 62/150, 186, 243, 244; 165/42, 43
See application file for complete search history.

(56) References Cited

U.S. PATENT DOCUMENTS

| | | | |
|---|---|---|---|
| 4,909,044 A | 3/1990 | Gudmundsen | |
| 5,894,737 A * | 4/1999 | Haeck | 62/285 |
| 5,904,053 A * | 5/1999 | Polk et al. | 62/285 |
| 5,954,578 A | 9/1999 | Takasaki | |
| 6,019,163 A | 2/2000 | Saida et al. | |
| 6,070,425 A * | 6/2000 | Ito et al. | 62/285 |
| 6,213,198 B1 | 4/2001 | Shikata et al. | |
| 6,293,339 B1 | 9/2001 | Uemura et al. | |
| 6,351,962 B1 | 3/2002 | Mizutani et al. | |
| 6,398,638 B1 | 6/2002 | Shibata et al. | |
| 6,415,857 B1 | 7/2002 | Nakamura et al. | |
| 6,440,189 B1 | 8/2002 | Sugano et al. | |
| 6,568,468 B1 | 5/2003 | Uemura et al. | |
| 6,598,670 B1 | 7/2003 | Hashimoto et al. | |
| 6,625,994 B2 | 9/2003 | Kakehashi et al. | |
| 6,640,570 B2 | 11/2003 | Nishida et al. | |
| 6,651,453 B2 * | 11/2003 | Klingler et al. | 62/244 |
| 6,715,540 B2 | 4/2004 | Kobayashi et al. | |
| 6,716,100 B2 | 4/2004 | Tsunooka et al. | |
| 6,796,368 B1 | 9/2004 | Okumura et al. | |
| 6,857,282 B2 | 2/2005 | Shichiken et al. | |
| 6,865,903 B2 | 3/2005 | Kosaka | |
| 6,926,940 B2 | 8/2005 | Ozaka et al. | |
| 7,407,001 B2 * | 8/2008 | Newman et al. | 165/202 |
| 2006/0242984 A1 * | 11/2006 | Kang et al. | 62/285 |

* cited by examiner

*Primary Examiner* — Frantz Jules
*Assistant Examiner* — Azim Rahim
(74) *Attorney, Agent, or Firm* — Harness, Dickey & Pierce, PLC

(57) ABSTRACT

An air conditioning case houses an evaporator for an air conditioning system and a blower unit. A drainage hole for water that condenses on the evaporator is located between the evaporator and the blower unit. An extension wall shields the drainage hole from the air blown by the blower unit. A shielding wall shields a water channel located between the evaporator and the air conditioning case from the blower unit. A partition wall located within the water channel extends from the air conditioning case to the evaporator.

14 Claims, 6 Drawing Sheets

AIR CONDITIONING CASE AND DRAIN FOR CONDENSATE REMOVAL

FIELD

The present disclosure relates to an air conditioning apparatus for an automotive vehicle. More particularly, the present disclosure relates to a drainage system for the air conditioning apparatus which removes water from the interior of an air conditioning case.

BACKGROUND

The statements in this section merely provide background information related to the present disclosure and may not constitute prior art.

Air conditioning systems for vehicles normally adopt an air conditioning unit in a transverse arrangement having a cooling unit, a heating unit and an air outlet mode selecting mechanism mounted transversely in a front portion of a passenger compartment at an approximate center position in a left-right direction of the vehicle. A blower unit for blowing air to the air conditioning unit is disposed at an offset position with respect to the air conditioning unit in the left-right direction. Cool air bypassing the heating unit and warm air having passed through the heating unit are mixed together in an air mixing chamber, and the ratio between the amount of cool air and the amount of warm air is adjusted by an air mixing door to provide air at a specified temperature. A defroster opening for blowing conditioned air toward an inner surface of a windshield of a vehicle is provided at an upper side of the air conditioning unit, a foot opening for blowing air toward the feet of a passenger is provided at a lower portion of the air conditioning unit, and a face opening for blowing air toward the head of the passenger is provided at an upper side of the air conditioning unit.

The cooling unit includes an evaporator and typically all air blown by the blower unit goes through the evaporator. When the evaporator is in the cooling mode, the air blown by the blower unit is cooled and this cooling of the air can cause moisture in the air to condense on the evaporator. The condensed moisture will typically flow under the force of gravity to the lower portion of the air conditioning unit where a drain hole is provided which drains the condensed moisture to a location outside of the vehicle.

When determining the location for the drain hole in the air conditioning unit, various design considerations need to be addressed. These design considerations include, but are not limited to, the flow direction of the moisture within the air conditioning unit, the blowing air passing through the air conditioning unit, accessibility to the outside of the vehicle, and the location of other components of the vehicle in relation to the air conditioning unit.

SUMMARY

The present disclosure includes an air conditioning unit having an air conditioning case with a drain hole. The drain hole is located at a position between an evaporator and a blower unit. The position of the drain hole is shielded from air blown by the blower unit by one or more walls that also guide the blown air into the evaporator and minimize the amount of blown air that is able to leak past and thus avoid passing through the evaporator.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
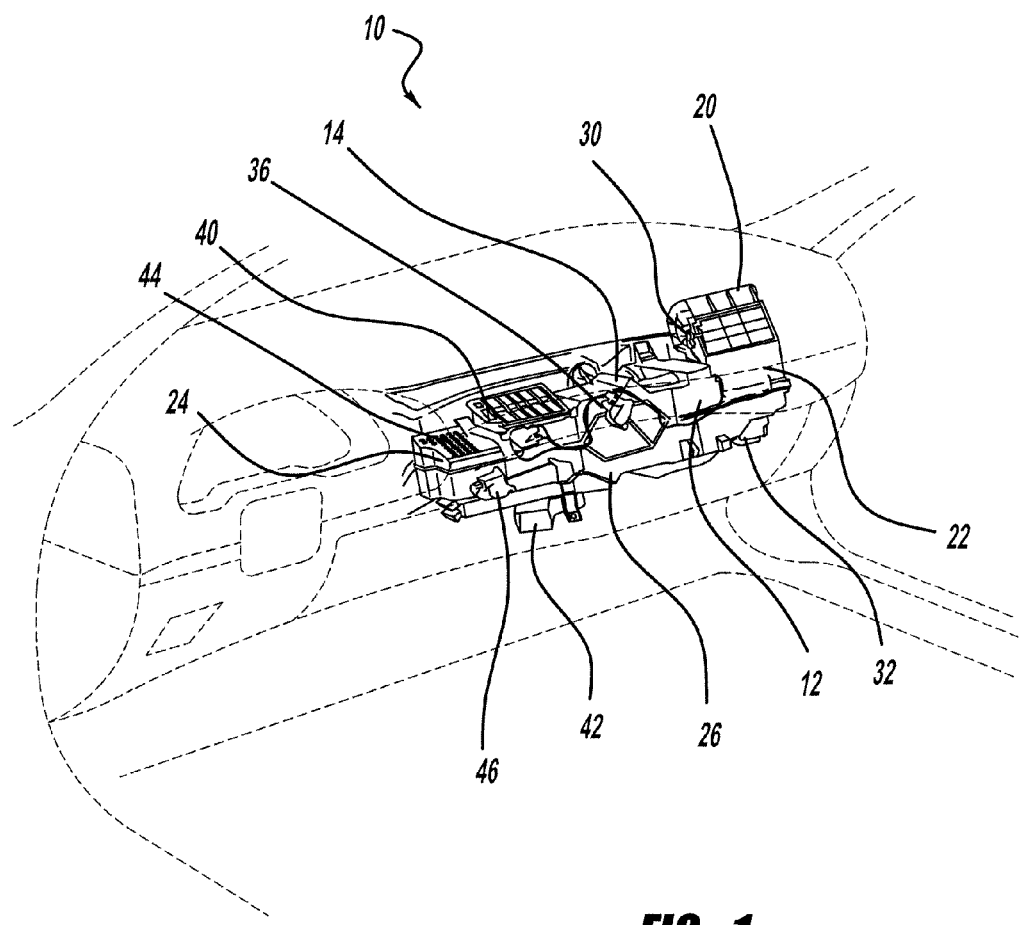
FIG. 1 is a perspective view of an air conditioning unit in accordance with the present invention disposed in a front portion of a passenger compartment of a vehicle.

The following description is merely exemplary in nature and is not intended to limit the present disclosure, application, or uses. Referring to FIG. 1, an air conditioning unit in accordance with the present invention is illustrated and is identified by the reference numeral 10. Air conditioning unit 10 is part of an air conditioning system which includes a compressor (not shown), a condenser (not shown), an expansion device (not shown) and an evaporator 12. Air conditioning unit 10 is also part of a vehicle heating system which includes the vehicle's engine (not shown), a water pump (not shown), a radiator (not shown) and a heating heat exchanger 14.

Air conditioning unit 10 comprises an air intake mechanism 20, a blower unit 22, evaporator 12, heating heat exchanger 14, an air outlet mode selecting mechanism 24 and an air conditioning case 26.

Air conditioning case 26 defines a channel for air to be blown into a passenger compartment and air conditioning case 26 houses the above elements. Air intake mechanism 20 is disposed within air conditioning case 26 and it is located at the beginning of air channel 28 and it selects the ratio between inside air and outside air provided to blower unit 22. An inside/outside air switching door mechanism 30 adjusts the ratio between inside air and outside air.

Blower unit 22 is disposed within air conditioning case 26 and it is located downstream from air intake mechanism 20 to receive air from air intake mechanism 20 and to blow this air through air channel 28 to the passenger compartment. Blower unit 22 includes a multi-speed blower motor 32 which rotates a fan (not shown) to blow air towards evaporator 12. The speed for blower motor 32 can be manually or automatically controlled.

Evaporator 12 is disposed within air conditioning case 26 and is located downstream from blower unit 22 and it crosses the entire air channel such that all air blown by blower unit 22 passes through evaporator 12. As discussed above, evaporator 12 is part of an air conditioning system which cools air blown by blower unit 22.

Heating heat exchanger 14 is disposed within air conditioning case 26 and is located downstream from evaporator 12. Heating heat exchanger crosses only a portion of the air channel such that a cool air bypass channel is defined within the air channel. An air temperature control mechanism 36 adjust the ratio of air passing through heating heat exchanger 14 and air bypassing heating heat exchanger 14 through the bypass channel to set the air temperature downstream of heating heat exchanger 14 to a specified temperature.

Air outlet mode selecting mechanism 24 is disposed within air conditioning case 26 and is located downstream from heating heat exchanger 14 to provide air to a specified location in the passenger compartment. Air conditioning case 26 defines a defrost opening 40 to blow air towards an inside surface of a windshield, a foot opening 42 to blow air towards the feet of a passenger and a face opening 44 to blow air toward a face of a passenger. Each opening 40, 42 and 44 are attached to appropriate duct work (not shown) to direct the blown air to the appropriate position in the passenger compartment. An air mode switching mechanism 46 selects from one or more of the openings as directed manually or automatically.

When air conditioning unit 10 is operating in an air cooling mode, the air being blown through evaporator 12 is cooled and is then subsequently provided to the passenger compartment through one or more of openings 40, 42, 44. The cooling of the air can cause moisture in the air to condense on evaporator 12 and this condensed moisture or water flows to the bottom of air conditioning case 26.

Referring now to FIGS. 2-7, the portion of air conditioning case 26 which drains this condensed moisture is illustrated in greater detail. Air conditioning case 26 defines a blower unit portion 50, an evaporator positioning portion 52 and a draining portion 54. Blower unit 50 positions blower motor 32 and it defines a scroll shape cavity within which a fan (not shown) is positioned. Air blown by the fan is directed towards and through evaporator 12.

Figure 2:
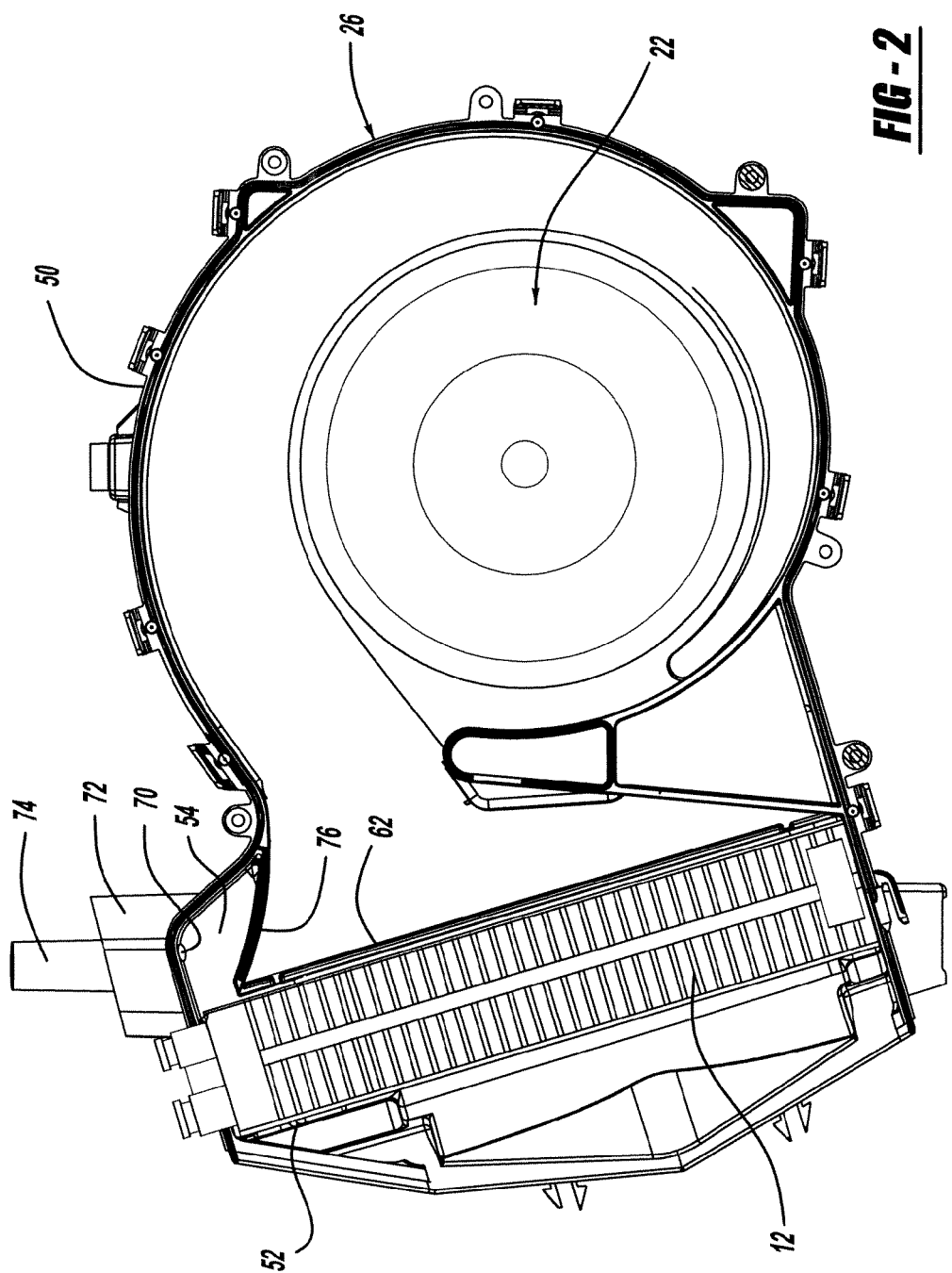
FIG. 2 is a top sectional view of the air conditioning case illustrated in FIG. 1.
Figure 3:
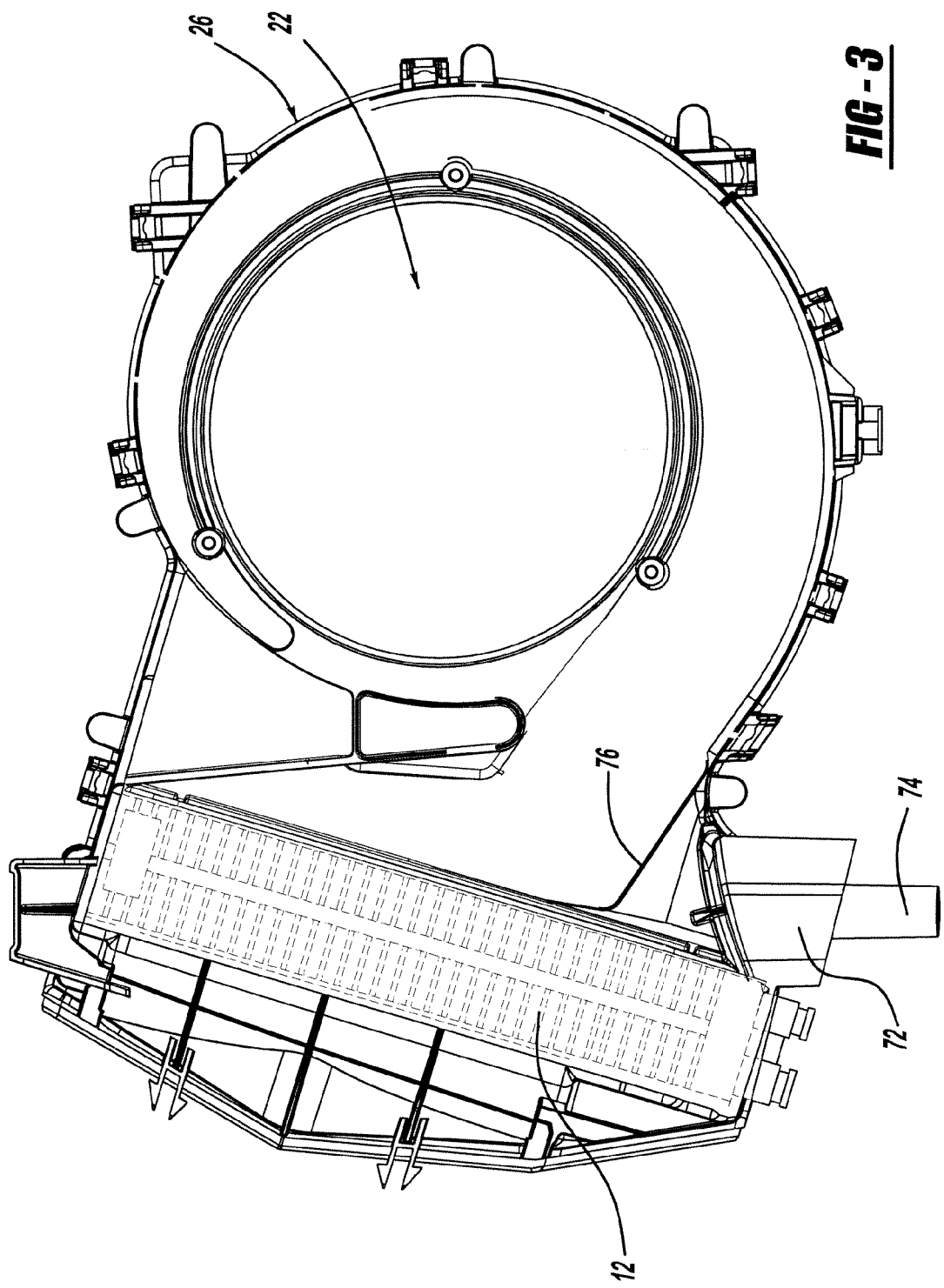
FIG. 3 is a bottom sectional view of the air conditioning case illustrated in FIG. 1.
Figure 4:
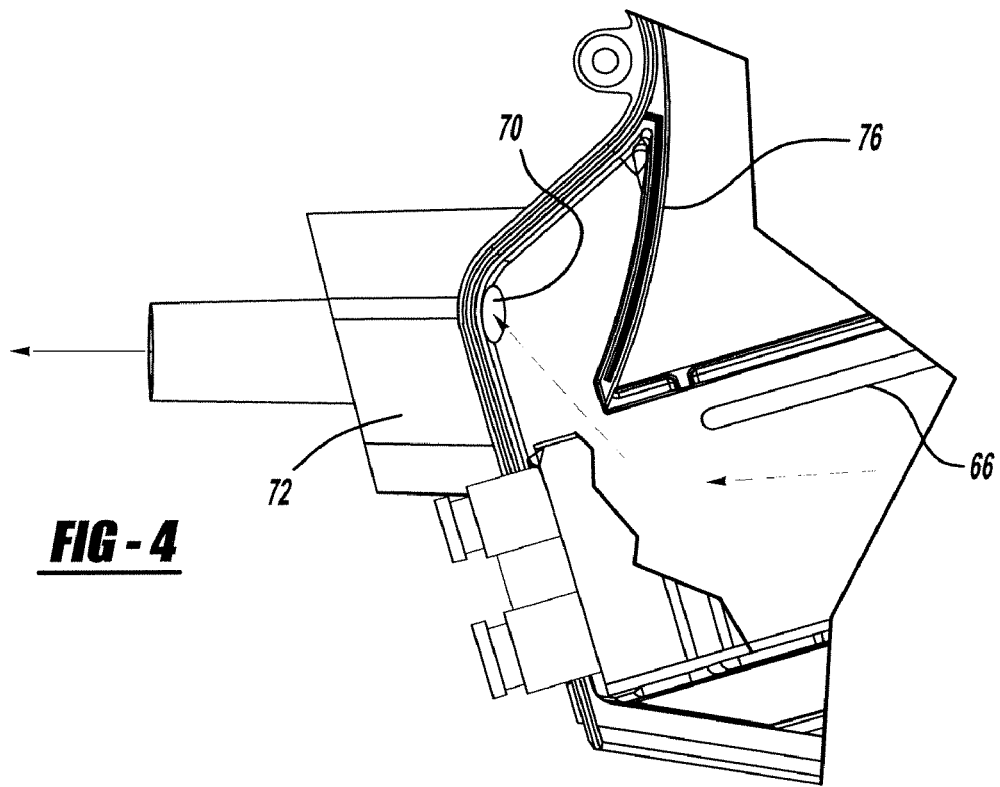
FIG. 4 is an enlarged view of the area surrounding the drain hole illustrated in FIG. 2.
Figure 5:
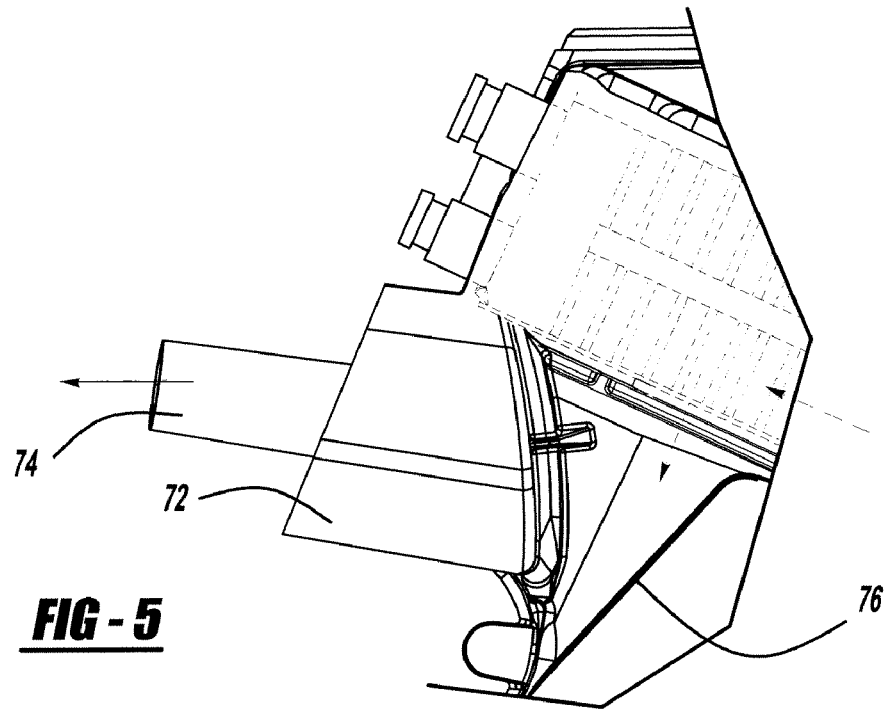
FIG. 5 is an enlarged view of the drain area illustrated in FIG. 3.
Figure 6:
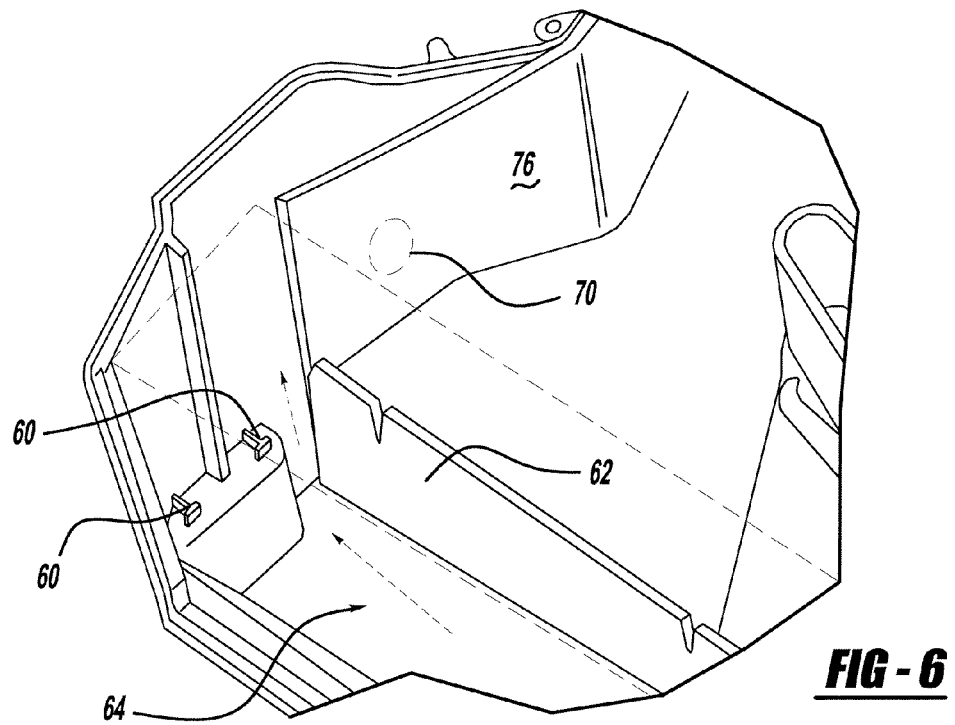
FIG. 6 is a perspective view of the area surrounding the drain hole illustrated in FIG. 4.
Figure 7:
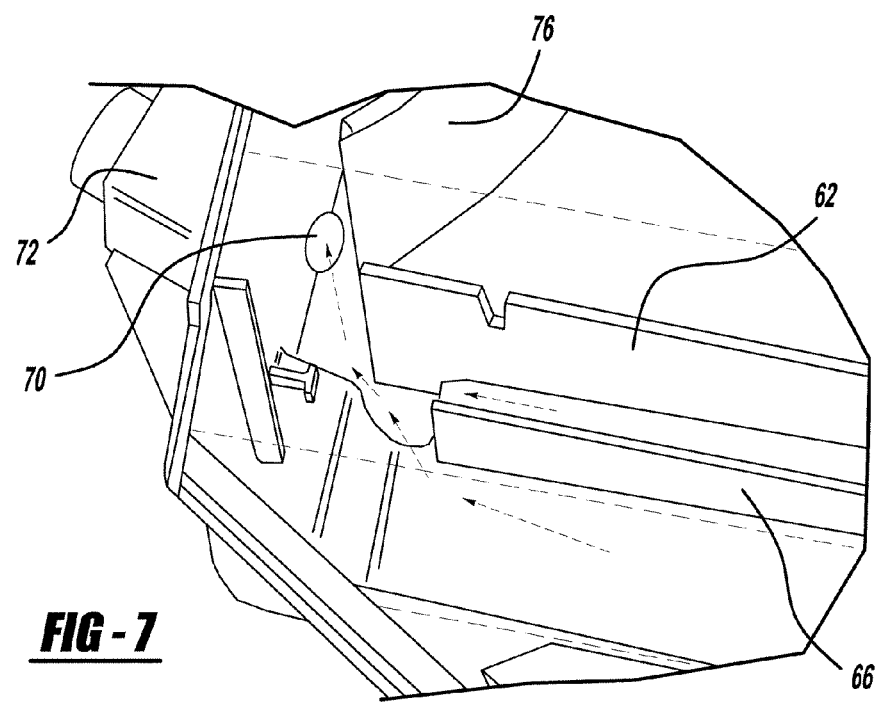
FIG. 7 is a perspective view similar to FIG. 6 but including a support wall for the evaporator.

Evaporator 12 is mounted within air conditioning case 26 using a set of mounts 60 formed into air conditioning case 26. Evaporator 12 extends across the entire cross-sectional area of the air channel. As illustrated in FIGS. 2, 4 and 6, a shielding wall 62 internal with or separate from air conditioning case 26 is disposed in front of evaporator 12 to prevent air flow from blower unit 22 from passing below evaporator 12. Evaporator 12 is positioned above the bottom wall of air conditioning case 26 such that an open channel 64 is defined between air conditioning case 26 and evaporator 12. Channel 64 provides an unobstructed route for water drainage as illustrated by the arrows in FIGS. 6 and 7. As illustrated in FIGS. 4 and 7, a partition wall 66 integral with or separate from air conditioning case 26 is disposed between air conditioning case 26 and evaporator 12 at a position below evaporator 12 to further restrict air from passing between evaporator 12 and air conditioning case 26. Partition wall 66 divides channel 64 into two channels as illustrated by the arrows in FIG. 7.

A drainage hole 70 extends through air conditioning case 26 to provide a route for the condensed water to leave air conditioning case 26. A drainage fitting 72 is attached to air conditioning case 26. Drainage fitting 72 defines an outlet 74 which is designed to extend through a hole in a body panel to the exterior of the vehicle or it is designed to accept a drain tube which extends between outlet 74 and the hole in the body panel.

As illustrated in FIGS. 2, 4, 6 and 7, drainage hole 70 is disposed between evaporator 12 and blower unit 22. An extension wall 76 extends from the portion of air conditioning case 26 that defines the scroll shaped cavity to provide a smooth flow of air to evaporator 12 and to shield drainage hole 70 from the flow of air provided by blower unit 22. Extension wall 76, shielding wall 62 and partition wall 66 work together to shield channel 64 and drainage hole 70 from the air flow from blower unit 22 which would impede the flow of the condensed water toward drainage hole 70. In addition, the outer wall of air conditioning case 26 is designed to provide an angled surface which angles towards drainage hole 70 when air conditioning unit 10 is installed in the vehicle. The combination of walls 76, 62 and 66 with the angled surfaces of air conditioning housing 26 provide for the free flow of the condensed water from evaporator 12 to drainage hole 70.

Figure 8:
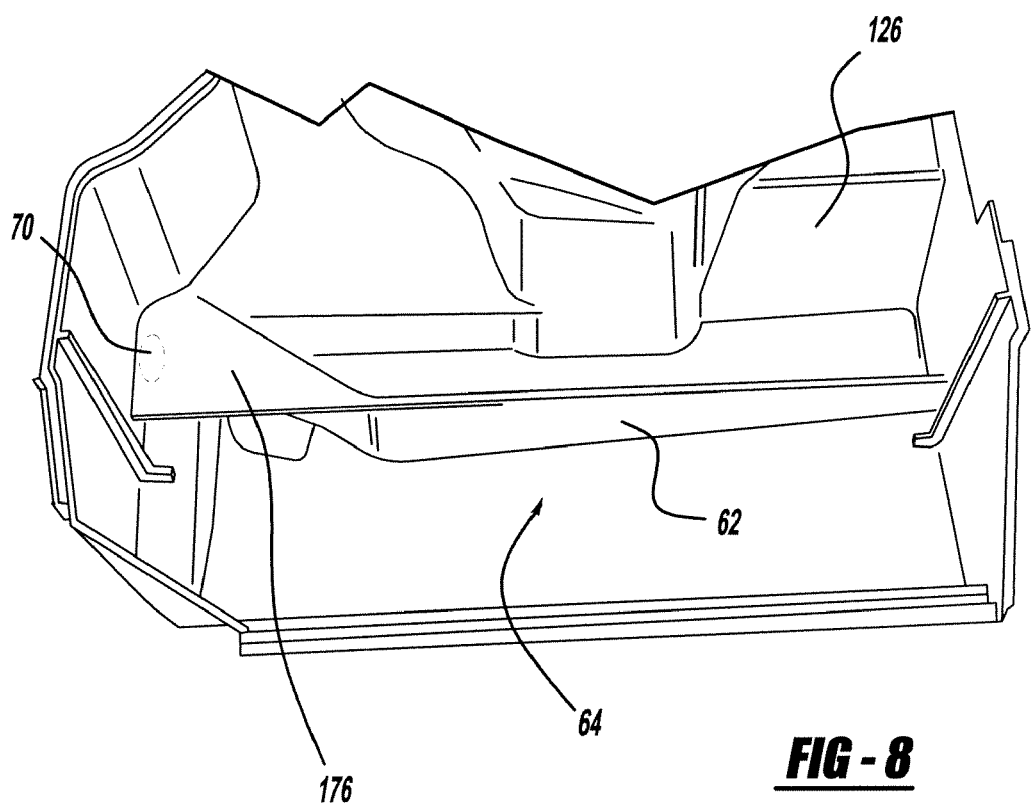
FIG. 8 is a perspective view of the area surrounding the drain hole in accordance with another embodiment of the present disclosure.

Referring now to FIG. 8, an air conditioning case 126 in accordance with the present disclosure is illustrated. Air conditioning case 126 is the same as air conditioning case 26 except that extension wall 76, a generally vertical wall, has been replaced by extension wall 176, a generally horizontal wall. Horizontal wall 176 shields drainage hole 70 from the air flow created by blower unit 22. Air conditioning case 126 also defines shielding wall 62 which is disposed in front of evaporator 12 to prevent air flow from blower unit 22 from passing below evaporator 12. Evaporator 12 is positioned above the bottom wall of air conditioning case 126 such that open channel 64 is defined between air conditioning case 126 and evaporator 12. While not illustrated in FIG. 8, air conditioning case 126 can also include partition wall 66 if desired.

What is claimed is:

1. An air conditioning apparatus comprising:
   an air conditioning case;
   an evaporator disposed within the air conditioning case;
   a blower unit for blowing air to the evaporator; and
   an extension wall extending from a position adjacent the evaporator to an inner wall of the air conditioning case; wherein
   the air conditioning case defines a water channel disposed on a bottom wall of the air conditioning case, and a drainage hole in communication with the water channel;
   the drainage hole is disposed apart from a position directly under a bottom surface of the evaporator toward an upstream side of airflow created by the blower;
   the blower unit defines a blower case connected to the air conditioning case;
   the extension wall has a smooth transition with an inner surface of the blower case; and
   the extension wall shields the drainage hole from the airflow created by the blower unit.

2. The air conditioning apparatus according to claim 1, wherein
   the blower case has a scroll shape, and
   the extension wall has an upstream end meeting with a downstream end of the scroll shape.

3. The air conditioning apparatus according to claim 1, the smooth transition is a stepless transition.

4. The air conditioning apparatus according to claim 1, wherein the extension wall is perpendicular to an upstream surface of the evaporator.

5. The air conditioning apparatus according to claim 1, wherein the extension wall extends vertically.

6. The air conditioning apparatus according to claim 1, wherein the extension wall extends horizontally.

7. The air conditioning apparatus according to claim 1, wherein the extension wall extends from the bottom wall of the air conditioning case.

8. The air conditioning apparatus according to claim 1, further comprising a shielding wall disposed in front of and parallel to an upstream surface of the evaporator, wherein the extension wall abuts the shielding wall.

9. The air conditioning apparatus according to claim 1, further comprising a shielding wall disposed in front of and parallel to an upstream surface of the evaporator, wherein the extension wall extends from the shielding wall.

10. The air conditioning apparatus according to claim 1, wherein the drainage hole is disposed on a side wall of the air conditioning case.

11. The air conditioning apparatus according to claim 1, wherein the water channel is located along the bottom surface of the evaporator.

12. The air conditioning apparatus according to claim 1, further comprising a partition wall disposed under the evaporator.

13. The air conditioning apparatus according to claim 1, further comprising a shielding wall disposed in front of and parallel to an upstream surface of the evaporator, and a partition wall disposed under the evaporator, wherein the partition wall is parallel to the shielding wall.

14. An air conditioning apparatus comprising:
an air conditioning case;
an evaporator disposed within the air conditioning case;
a blower unit for blowing air to the evaporator; and
an extension wall extending from a position adjacent the evaporator to an inner wall of the air conditioning case; wherein
the air conditioning case defines a water channel disposed on a bottom wall of the air conditioning case, and a drainage hole in communication with the water channel;
the drainage hole is disposed apart from a position directly under a bottom surface of the evaporator toward an upstream side of airflow created by the blower;
the blower unit defines a scroll shape blower case connected to the air conditioning case;
the extension wall has an upstream end meeting with a downstream end of the scroll shape of the blower case; and
the extension wall shields the drainage hole from the airflow created by the blower unit.

* * * * *